United States Patent [19]

Vanlautem et al.

[11] 4,145,526

[45] Mar. 20, 1979

[54] PROCESS FOR DEPOLYMERIZING HYDROXYCARBOXYLIC POLYMERS

[75] Inventors: Nöel Vanlautem, Wavre; Jacques Gilain, Brussels, both of Belgium

[73] Assignee: Solvay & Cie, Brussels, Belgium

[21] Appl. No.: 868,467

[22] Filed: Jan. 9, 1978

[30] Foreign Application Priority Data

Jan. 10, 1977 [FR] France .................................. 77 00669

[51] Int. Cl.² .............................................. C08F 8/50
[52] U.S. Cl. ..................................... 528/481; 526/16; 526/317; 528/483; 528/503
[58] Field of Search ........................ 528/481, 483, 503

[56] References Cited

U.S. PATENT DOCUMENTS

| | | | |
|---|---|---|---|
| 2,372,001 | 3/1945 | Joyce | 260/86 |
| 3,311,583 | 3/1967 | Bearden | 528/503 |
| 3,632,798 | 1/1972 | Morita et al. | 528/481 |

FOREIGN PATENT DOCUMENTS

883804 12/1961 United Kingdom.

*Primary Examiner*—Stanford M. Levin
*Attorney, Agent, or Firm*—Spencer & Kaye

[57] ABSTRACT

Process for obtaining hydroxycarboxylic polymers of reduced molecular weight from corresponding polymers of higher molecular weight, comprising heating the polymer of higher molecular weight in a gaseous medium to a temperature of between 60° and 240° C.

11 Claims, No Drawings

PROCESS FOR DEPOLYMERIZING HYDROXYCARBOXYLIC POLYMERS

BACKGROUND OF THE INVENTION

The present invention relates to a process for the depolymerization of hydroxycarboxylic polymers in order to obtain products of low molecular weight which can be used as active adjuvants (builders) in detergent compositions.

Processes are known for depolymerizing certain polymers such as polyethylene thermally in the solid phase under a gas atmosphere. These processes suffer from the disadvantages of requiring the use of high temperatures and of causing uncontrolled decompositions of the polymer.

To avoid these disadvantages, it has been proposed to carry out the depolymerization at lower temperatures, using processes in which the polymer is dissolved or dispersed in a suitable solvent or diluent, such as water, in the presence of compounds which generate free radicals. This way of operating is also accompanied by disadvantages inherent in the method. In the first place, dissolving or dispersing the starting polymer in the depolymerization solvent or diluent is often difficult and the energy required to remove the solvent or the diluent and recover the final polymer is high. Furthermore, if the polymer is recovered by precipitation of a solution, the method is accompanied by a loss of polymer due to the preferential dissolution of the polymer of low molecular weight. Finally, a loss of polymer by formation of secondary oxidation products due to the presence of initiators of radical reactions is observed.

SUMMARY OF THE PRESENT INVENTION

There has now been found, in accordance with the present invention, a process which makes it possible to depolymerize hydroxycarboxylic polymers which does not suffer from the disadvantages mentioned above.

The present invention, as embodied and broadly described, provides a process for obtaining hydroxycarboxylic polymers of reduced molecular weight from corresponding polymers of higher molecular weight, in which the polymer of higher molecular weight is heated in a gaseous medium to a temperature of between 60° and 240° C.

It is to be understood that both the foregoing general description and the following detailed description are exemplary, but are not restrictive of the invention.

DETAILED DESCRIPTION OF THE PRESENT INVENTION

The process of the present invention is applicable to the depolymerization of various types of hydroxycarboxylic polymers. As examples of such polymers, there may be mentioned the polyhydroxycarboxylates described in German Pat. Application No. 1,904,940, filed on Feb. 1, 1969 in the name of DEGUSSA.

Particularly suitable hydroxycarboxylic polymers are those which contain monomer units of the formula

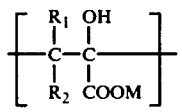
I.

where $R_1$ and $R_2$ represent hydrogen or an alkyl group containing from 1 to 3 carbon atoms which can be substituted by a hydroxyl group or by a halogen atom, and $R_1$ and $R_2$ can be identical or different, and where M represents hydrogen, an alkali metal atom or an ammonium group. Most commonly, M represents a sodium or potassium atom or an ammonium group. Preferably, M represents a sodium atom.

The polymers which can be used according to the present invention are preferably those defined above in which $R_1$ and $R_2$ represent hydrogen or a methyl group, and $R_1$ and $R_2$ can be identical or different. The best results are obtained with polymers where $R_1$ and $R_2$ represent hydrogen.

The polymers used in the present invention are selected from among the homopolymers and the copolymers containing units as defined above in formula I, which are all of the same type or of several different types. Thus, the polymers are either homopolymers only containing monomeric units of formula I; or copolymers containing: (a) nothing but comonomers of formula I, but different by the nature of $R_1$, $R_2$ and/or M; or (b) monomers of formula I copolymerized with another monomer, such as a monomer which can advantageously be substituted by carboxyl or hydroxyl groups. If copolymers are used, they are most frequently selected from among those which contain at least 20% of units as defined above in formula I, and preferably from among those which contain at least 50% of such units. The best results are obtained with polymers which only contain units such as those defined above in formula I.

Among the copolymers which can be used, there are those which contain units derived from vinyl monomers substituted by groups selected from among hydroxyl and carboxyl groups. Advantageously, these copolymers contain acrylic units of the formula

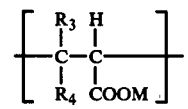
II.

where $R_3$ and $R_4$ represent a hydrogen atom or an alkyl group containing from 1 to 3 carbon atoms and where M has the same meaning as above. Among these copolymers, it is preferred to use those containing acrylic units derived from unsubstituted acrylic acid, where $R_3$ and $R_4$ represent hydrogen.

The hydroxycarboxylic polymers which can be used according to the present invention can be employed in the form of salts of polyhydroxycarboxylic acids or in the form of polyhydroxycarboxylic acids. In the latter case, they can be employed in the form of the corresponding polylactones. The polylactones derived from the polyhydroxycarboxylic acids according to the invention are intermolecular weight and/or intramolecular esters obtained by reaction of the acid groups of the polymers with the alcohol groups, and these groups can be either partially or completely lactonized. The degree of lactonization of the group in question is in general between 30 and 100%.

Particularly suitable polymers are sodium poly-alpha-hydroxyacrylate and the polylactone derived from poly-alpha-hydroxyacrylic acid.

The starting polymers used according to the invention can be prepared by any known process, for example by that described in Belgian Pat. No. 817,678 filed on July 15th, 1974 in the name of Solvay & Cie.

The starting polymers can be employed in any form. For reasons of convenience it is, however, preferred to employ them in the form of particles. During the process, the polymers may have any consistency, namely solid, pasty or molten.

The average molecular weight of the starting polymers is of course greater than that of the polymer which it is desired to obtain. In other respects it is in itself not critical and it is possible to employ starting polymers of very varying molecular weights. The choice of the molecular weight of the starting polymer is linked to the availability of the particular material. Preferably, the starting polymer used is a polymer having a molecular weight which is not much greater than that of the polymer which it is desired to obtain, so as not to have to work at too high a temperature and with too long a reaction time. Polymers of average molecular weight greater than about 3,000 are generally used as the starting polymers. In general, their average molecular weight is between 5,000 and 1,000,000. The best results are obtained when the average molecular weight is between about 10,000 and 800,000.

The average molecular weights ($M_F$) referred to above are determined from the FLORY relation and are based on combined ultracentrifuging measurements and intrinsic viscosity measurements, (L. MANDERKERN and P. J. FLORY, Journ of Chem. Physics, 1952, 20, pages 212–214).

The thermal depolymerization carried out in accordance with the present invention generally takes place at between 60° and 240° C. and most commonly between 70° and 200° C. Higher temperatures generally cause decomposition of the polymer treated. Preferably, the depolymerization is carried out between 100° and 150° C.

The duration of the depolymerization treatment is selected in accordance with the precise chemical nature of the hydroxycarboxylic polymer starting material, its initial average molecular weight, the working temperature and the average molecular weight which it is desired to obtain. In general, the depolymerization times are between 10 minutes and 10 days and most frequently between 1 hour and 100 hours. It is preferred to use process times of between 2 hours and 80 hours.

The depolymerization in a gaseous medium, in accordance with the present invention, can be carried out under any pressure. It is advantageously carried out at absolute pressures of between 0.001 and 5 kg/cm$^2$. In general, pressures of between 0.01 and 3 kg/cm$^2$ are used.

The polymers obtained according to the present invention have a molecular weight which depends in particular on the temperature and on the duration of the depolymerization. A high temperature and a long contact time favor, independently of one another, the production of polymers of low molecular weight. Another factor which influences the molecular weight of the final product is the molecular weight of the starting polymer. However, it is possible, using one and the same starting polymer, to obtain polymers of very different molecular weights depending on the temperature and duration of the treatment. The ratio of the molecular weight of the starting polymer to that of the final polymer is generally between 1.2 and 100. Ratios of between 1.5 and 20 are easily obtained. The molecular weights obtained by depolymerization vary greatly, but are frequently between 500 and 200,000 and generally between 2,000 and 100,000.

The depolymerization can be carried out in any gaseous medium. The latter generally consists of air or of an inert gas. By inert gas are understood the gases which are inert towards the polymer under the depolymerization conditions. Thus, it is possible to use all the rare gases from the Periodic Table of the elements, as well as nitrogen. Other gases which are inert towards the starting polymer under the depolymerization conditions can also prove suitable. Mixtures of gases can also be used. For reasons of convenience, the depolymerization is most frequently carried out in gaseous media containing air or nitrogen.

The polymer of reduced molecular weight obtained in accordance with the present invention can be used as such or can be subjected to subsequent treatments such as, for example, granulation, depending on whether it is desired to modify certain of its mechanical properties.

The depolymerization according to the present invention can be carried out in any installations which make it possible to combine the conditions in respect of temperature, pressure and environment which are required for the operation. Thus, the depolymerization can be carried out equally well in driers, ovens, tubes and the like. The chemical nature of the materials of which these apparatus consist is not critical. The depolymerization can be carried out continuously or discontinuously. The polymer can be employed in different ways in the apparatus. However, it is preferred to work in a fixed bed or a fluidized bed. An advantageous method of working consists of arranging the starting polymer in a fluidized bed swept by a stream of gas preheated to a temperature such that the temperature of the bed is within the limits of 60° C. to 240° C. for the thermal depolymerization. Thus, the stream of gas which serves to fluidize the particles of starting polymer can advantageously be preheated to temperatures of between 100° and 300° C.

The process according to the present invention is of remarkable efficiency. In fact, it makes it possible to obtain hydroxycarboxylic homopolymers or copolymers of reduced molecular weight without loss of product by oxidation or by uncontrolled decomposition. Using the process, it becomes possible to obtain, for the category of polymers in question, a whole range of products having different molecular weights, while only carrying out a single polymerization. The product resulting from the polymerization can be stored and is available at any time for producing the polymer of the desired molecular weight by depolymerization, without substantial loss of product.

The polymers obtained according to the present invention can be used for various applications and especially as active adjuvants (builders) in detergent compositions and as dispersing agents for organic and inorganic molecules.

The examples which follow in no way imply a limitation and were carried out in order to show the remarkable results obtained in accordance with the process of the invention.

EXAMPLE 1

The experiments were carried out in an oven in which a partial vacuum of 20 mm of mercury is set up. The residual gas in the oven is air. The polymer treated is sodium poly-alpha-hydroxyacrylate having a FLORY molecular weight ($M_F$) of 78,000, which has been dried beforehand for 8 hours at 50° C. under a pressure of 19 mm of mercury. A number of 3 g portions of this dried polymer are taken and are treated in the oven at different temperatures for varying times. Table 1 shows the change in the molecular weight as a function of the temperature and the duration of the treatment.

TABLE 1

| Experiment | Temperature °C | Duration hours | $M_F \times 10^{-3}$ |
|---|---|---|---|
| 1 | 75 | 24 | 77 |
| 2a | 90 | 7 | 75 |
| 2b | 90 | 14 | 74 |
| 3a | 100 | 16 | 69 |
| 3b | 100 | 23 | 68 |
| 4a | 110 | 16 | 61 |
| 4b | 110 | 23 | 60 |
| 4c | 110 | 41 | 57 |
| 5a | 120 | 16 | 51 |
| 5b | 120 | 33 | 43 |
| 5c | 120 | 48 | 41 |
| 5d | 120 | 72 | 34 |
| 5e | 120 | 96 | 34 |
| 6a | 130 | 24 | 29 |
| 6b | 130 | 48 | 27 |
| 6c | 130 | 72 | 25 |
| 6d | 130 | 96 | 22 |
| 7a | 140 | 24 | 17 |
| 7b | 140 | 53 | 15 |
| 7c | 140 | 77 | 14 |
| 8a | 150 | 24 | 11 |
| 8b | 150 | 48 | 9 |

EXAMPLE 2

A polymer of the same nature which has undergone the same preparatory treatment as that described in Example 1, but which has an initial molecular weight ($M_F$) of 69,000 is depolymerized at 100°, 110° and 120° C. The results are shown in Table 2. The working conditions are identical to those of Example 1.

TABLE 2

| Duration in hours | Temperature 100° C. | | Temperature 110° C. | | Temperature 120° C. | |
|---|---|---|---|---|---|---|
| | Experiment | $M_F \times 10^{-3}$ | Experiment | $M_F \times 10^{-3}$ | Experiment | $M_F \times 10^{-3}$ |
| 2 | 9a | 63 | 10a | 64 | 11a | 59 |
| 5 | 9b | 61 | 10b | 56.5 | 11b | 43 |
| 8 | 9c | 56.5 | 10c | 53 | 11c | 33.5 |
| 24 | 9d | 51.5 | 10d | 45 | 11d | 23.5 |
| 48 | 9e | 44.5 | 10e | 40 | 11e | 16.5 |
| 72 | 9f | 40.5 | 10f | 35 | 11f | 15 |
| 96 | 9g | 36 | 10g | 32 | 11g | 11 |

EXAMPLE 3

The operations described in Example 1 are repeated under identical conditions, using a polymer of identical structure but having an initial molecular weight $M_F$ of 41,000. The results are shown in Table 3.

TABLE 3

| Duration in hours | Temperature 100° C. | | Temperature 110° C. | | Temperature 120° C. | |
|---|---|---|---|---|---|---|
| | Experiment | $M_F \times 10^{-3}$ | Experiment | $M_F \times 10^{-3}$ | Experiment | $M_F \times 10^{-3}$ |
| 2 | 12a | 38 | 13a | 37 | 14a | 35.5 |
| 5 | 12b | 37.5 | 13b | 34 | 14b | 30.5 |
| 8 | 12c | 36 | 13c | 33.5 | 14c | 27.5 |
| 24 | 12d | 34 | 13d | 32 | 14d | 22.5 |
| 48 | 12e | 31.5 | 13e | 31 | 14e | 18 |
| 72 | 12f | 30.5 | 13f | 29.5 | 14f | 16.5 |
| 96 | 12g | 29 | 13g | 25 | 14g | 14 |

EXAMPLE 4

A sample of sodium poly-alpha-hydroxyacrylate, which has a molecular weight $M_F$ of 44,000 and has undergone the same preparatory treatment as described in Example 1, is heated for 24 hours at 100° C., the working conditions being identical to those of Example 1. A polymer having a molecular weight $M_F$ of 35,000 is obtained (Experiment 15a). After an additional 24 hours of treatment at 120° C. the molecular weight $M_F$ of this polymer is 7,000 (Experiment 15b).

EXAMPLE 5

Example 4 is repeated on a polymer having a molecular weight $M_F$ of 36,000.

After 24 hours of heating at 100° C., a polymer having a molecular weight $M_F$ equal to 25,000 (Experiment 16a) is obtained.

An additional 24 hours of heating at 120° C. make it possible to reach a molecular weight $M_F$ of 5,000 (Experiment 16b).

EXAMPLE 6

A sample of sodium poly-alpha-hydroxyacrylate, which has a molecular weight of $M_F$ of 37,000 and has undergone the same preparatory treatment as described in Example 1, is heated for 24 hours at 120° C. under the same conditions as those shown in Example 1. A polymer having a molecular weight $M_F$ of 7,000 (Experiment 17) is obtained.

Examination of the results of Examples 1 to 6 shows that in effect depolymerization in the solid phase of the hydroxycarboxylic polymers has taken place and has done so in spite of the use of relatively low temperatures. It can be seen from examination of Tables 1, 2 and 3 and of the results of Examples 4, 5 and 6 that in spite of the limited durations of the experiments, the depolymerization already manifests itself at 75° C. and becomes considerable from 90°–100° C. onwards and very rapid towards temperatures of 150° C.

Examination of the results also shows that it is possible to obtain polymers of similar molecular weights by using starting polymers of different molecular weights, if the duration and temperature of the heating process is varied. See for example, Experiment 7c, 11f and 14g.

Furthermore, examination of the results also shows that polymers of different origin obtained either directly by polymerization or by prior depolymerization but having approximately the same molecular weight, make it possible to obtain, under the same experimental conditions, polymers which have substantially the same final molecular weight. See Experiments 15b and 17.

EXAMPLE 7

Sodium poly-alpha-hydroxyacrylate having a molecular weight $M_F$ of 69,000 is subjected to the same preparatory treatment as described in Example 1. Two identical samples are heated at 120° C. in a U-tube, respectively, under a stream of air and a stream of nitrogen. The pressure at the top of the tube is 1 kg/cm². The results of the depolymerization as a function of the time are shown in Table 4 below.

TABLE 4

| | $M_F \times 10^{-3}$ | |
|---|---|---|
| Duration in hours | Air (Experiment 18) | Nitrogen (Experiment 19) |
| 1 hr 15 mins | 69 | 64 |
| 6 hrs 45 mins | 50 | 50 |
| 12 hrs 45 mins | — | 43 |
| 23 hrs 45 mins | 28 | — |
| 29 hrs 45 mins | 27 | 31 |
| 35 hrs 45 mins | 25 | — |
| 41 hrs | — | 27 |
| 59 hrs 45 mins | 18 | — |
| 64 hrs | — | 20 |
| 101 hrs | 14 | — |

It follows from examination of Table 4 that a polymer according to the present invention, heated under identical conditions under an inert atmosphere or in air, gives rise to polymers having substantially the same molecular weights, within the limits of experimental error.

It will be understood that the above description of the present invention is susceptible to various modifications, changes and adaptations, and the same are intended to be comprehended within the meaning and range of equivalents of the appended claims.

What is claimed is:

1. Process for obtaining a hydroxycarboxylic polymer of reduced molecular weight from a corresponding polymer of higher molecular weight, the hydroxycarboxylic polymer containing monomer units of the formula

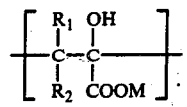

in which $R_1$ and $R_2$ represent hydrogen or an alkyl group containing from 1 to 3 carbon atoms which can be substituted by a hydroxyl group or by a halogen atom, and $R_1$ and $R_2$ can be identical or different, and where M represents hydrogen, an alkali metal atom or an ammonium group comprising heating the said polymer of higher molecular weight in a gaseous medium to a temperature of between 60° and 240° C., said polymer of higher molecular weight having a Flory average molecular weight greater than about 3,000.

2. Process according to claim 1, wherein M represents a sodium atom.

3. Process according to claim 1, wherein the hydroxycarboxylic polymer is a homopolymer.

4. Process according to claim 3, wherein the hydroxycarboxylic polymer is sodium poly-alpha-hydroxyacrylate.

5. Process according to claim 1, wherein the gaseous medium contains a gas selected from the group consisting of air and the inert gases.

6. Process according to claim 5, wherein the gaseous medium contains nitrogen.

7. Process according to claim 5, wherein the gaseous medium contains air.

8. Process according to claim 1, wherein the heating is carried out under a pressure of between 0.001 and 5 kg/cm².

9. Process according to claim 1, wherein the temperature to which the polymer of higher molecular weight is heated is between 70° and 200° C.

10. Process according to claim 1, wherein the heating time is between 10 minutes and 10 days.

11. Process according to claim 1, wherein the Flory average molecular weight of the polymer of higher molecular weight is between 5,000 and 800,000.

* * * * *